(12) United States Patent
Hettich et al.

(10) Patent No.: US 12,375,412 B2
(45) Date of Patent: Jul. 29, 2025

(54) ASYNCHRONOUS PROCESSING OF PRODUCT LIFECYCLE MANAGEMENT (PLM) INTEGRATION MESSAGES

(71) Applicant: SAP SE, Walldorf (DE)

(72) Inventors: Michael Hettich, Heidelberg (DE); Andre Klahre, Angelbachtal (DE)

(73) Assignee: SAP SE, Walldorf (DE)

( * ) Notice: Subject to any disclaimer, the term of this patent is extended or adjusted under 35 U.S.C. 154(b) by 58 days.

(21) Appl. No.: 18/227,529

(22) Filed: Jul. 28, 2023

(65) Prior Publication Data
US 2025/0039100 A1 Jan. 30, 2025

(51) Int. Cl.
*H04L 47/2441* (2022.01)
*H04L 69/22* (2022.01)

(52) U.S. Cl.
CPC .......... *H04L 47/2441* (2013.01); *H04L 69/22* (2013.01)

(58) Field of Classification Search
CPC ............................ H04L 47/2441; H04L 69/22
See application file for complete search history.

(56) References Cited

U.S. PATENT DOCUMENTS

| | | | | |
|---|---|---|---|---|
| 8,412,741 B2* | 4/2013 | Hein | ...................... | G06Q 10/04 707/600 |
| 10,802,762 B1* | 10/2020 | Gray | ...................... | G06F 3/0604 |
| 2006/0026214 A1* | 2/2006 | Berg | ...................... | G06F 9/5027 |
| 2009/0192857 A1* | 7/2009 | Morse | ................ | G06Q 10/0631 705/7.12 |
| 2014/0279869 A1* | 9/2014 | Wu | ......................... | G06F 16/27 707/610 |

OTHER PUBLICATIONS

Sylvain Kubler et al. "Towards data exchange interoperability in building lifecycle management", 2014 IEEE Emerging Technology and Factory Automation (ETFA), 8 pages. (Year: 2014).*
Sylvain Kubler et al. "P2P Data synchronization for product lifecycle management", available online Nov. 22, 2014, 17 pages. (Year: 2014).*
Adam Kotwasinski. "Large Message Handling with Kafka: Chunking vs. External Store", publicly posted on medium.com on May 23, 2018, 23 pages. (Year: 2018).*

* cited by examiner

Primary Examiner — G. C. Neurauter, Jr.
(74) Attorney, Agent, or Firm — SCHWEGMAN LUNDBERG & WOESSNER, P.A.

(57) ABSTRACT

In an example embodiment, asynchronous message processing is performed in a PLM system integration (PLMSI), at least for large message payloads. A processing decision is made as to whether to process a payload synchronously versus asynchronously. In the case of asynchronous processing, this processing can be started in a separate thread from the synchronous communication connection used to transmit the message and payload. The synchronous communication connection (which may be implemented in, for example, Hypertext Transfer Protocol (HTTP)) can be closed after the message was successfully received to prevent connection timeouts.

20 Claims, 6 Drawing Sheets

ASYNCHRONOUS PROCESSING OF PRODUCT LIFECYCLE MANAGEMENT (PLM) INTEGRATION MESSAGES

TECHNICAL FIELD

This document generally relates to computer systems. More specifically, this document relates to the asynchronous processing of product lifecycle management (PLM) integration messages.

BACKGROUND

Specialized software, is used to streamline and automate Product Lifecycle Management (PLM) processes, enabling effective collaboration, data management, and traceability throughout the product lifecycle.

PLM system integration (PLMSI) acts to implement specific software to connect Product PLM systems with each other. Specifically, it acts to create and update specific business objects received from external Product Data Management (PDM) systems or other enterprise systems or software applications enable seamless data exchange, collaboration, and automation across different functional areas within an organization.

Integration is important because it allows different computer systems to communicate and share information, eliminating data silos and ensuring consistency and accuracy of product-related data throughout the organization. It enables cross-functional teams, such as engineering, manufacturing, supply chain, and sales, to work together more effectively and make informed decisions based on real-time, up-to-date data.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
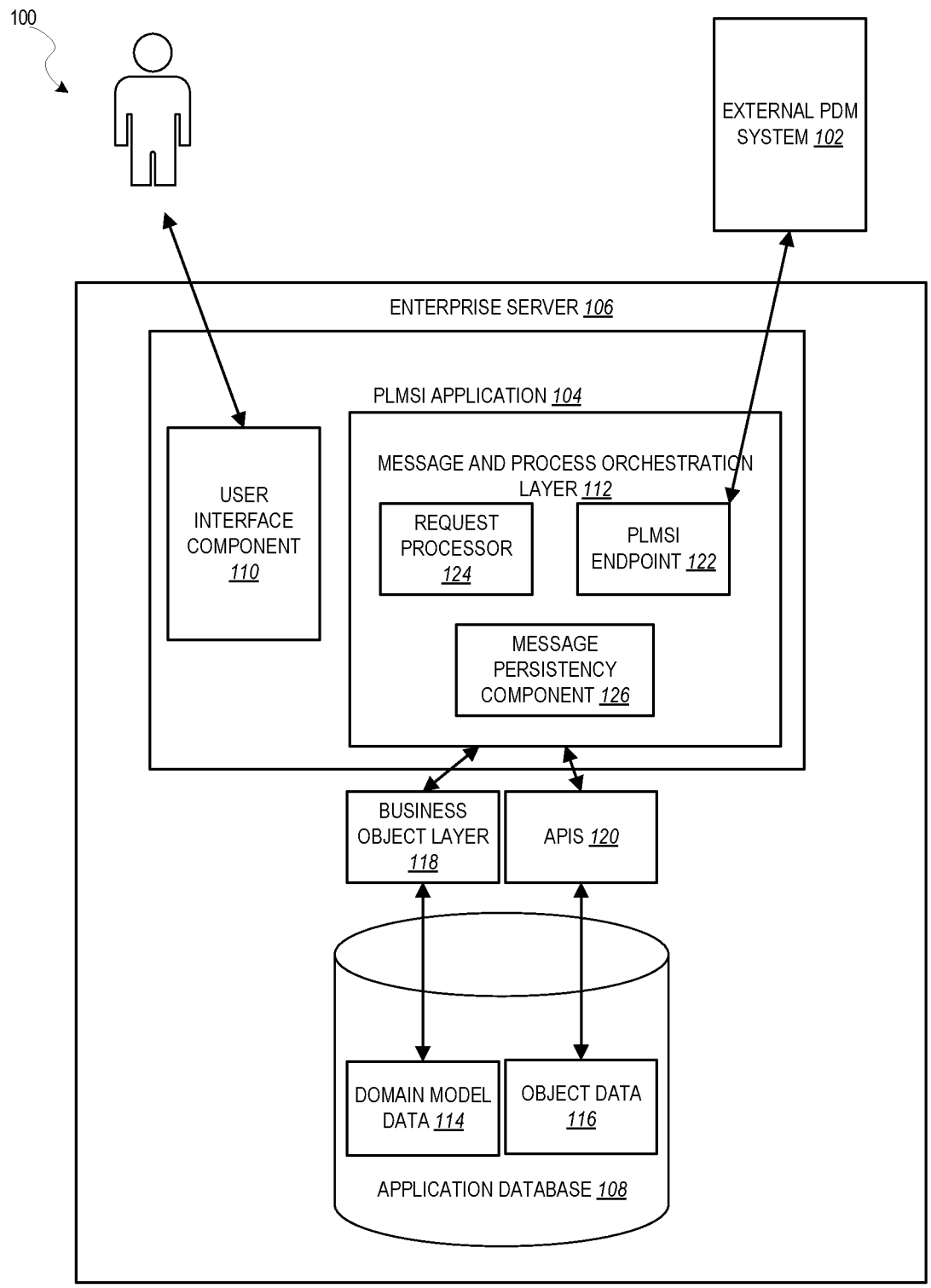
FIG. 1 is a block diagram illustrating a system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Various technical issues are encountered when implementing PLMSI components in certain systems. Specifically, PLM objects may be highly complex, with multiple linked and associated other business objects. This results in the data set received with a single message being quite large, such as being multiple gigabytes large. This can lead to connection timeouts in PLMSI components, as the time it takes to process such large data sets exceeds the timeout thresholds of many synchronous protocols.

For example, a bill of material of a complex item, such as an aircraft carrier, may contain several thousands of components. This huge data volume can lead to timeouts if transferred synchronously in one message from a PDM system to a PLMSI component.

These technical problems become even more severe if the PLMSI solution is hosted as a cloud application, where the underlying infrastructure and system resources are highly dependent on customer quotas and contracts. Despite these issues, it is important that the PLMSI works in a reliable and efficient manner.

In an example embodiment, asynchronous message processing is performed in a PLMSI, at least for large message payloads. A processing decision is made as to whether to process a payload synchronously versus asynchronously. In the case of asynchronous processing, this processing can be started in a separate thread from the synchronous communication connection used to transmit the message and payload. The synchronous communication connection (which may be implemented in, for example, Hypertext Transfer Protocol (HTTP)) can be closed after the message was successfully received to prevent connection timeouts.

In an example embodiment, the processing can be further optimized by implementing a queue for the received messages. This enables various potential optimizations with respect to sequence and parallelization of received messages or received parts of messages. Also, the queue enables further optimization in the sending system to prevent timeouts/memory overflow when sending an extremely large message by splitting the extremely large message into smaller message packages, which are only processed in the receiving system once each message package is received and validated successfully.

The decision on whether to process a message payload synchronously or asynchronously may be made in a number of different ways. In one example embodiment, the sending PDM system explicitly specifies which mechanism to use to process the payload by adding a specific header attribute to the message. For example, an HTTP header attribute "prefer-respond-async" as defined in the OData protocol may be specified if the sending PDM system intends for the payload to be processed asynchronously.

In another example embodiment, one or more customer-specific configuration rules may be used to automate the decision as to whether to process the payload synchronously or asynchronously. These configuration rules may base their decision on various contextual attributes, such as the size of the payload, the deepness of the received object structure, and current workload and resource availability of the processing system(s), etc.

In another example embodiment, a machine learning model may be used to determine whether to process the payload synchronously or asynchronously. For example, a machine learning model may be trained by any algorithm from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the machine learning algorithm used to train the machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function. The input variables may include features such as the payload size, the deepness of the received object structure, the current processing workload of the processing system, and/or how full the memory of the processing system is.

In some example embodiments, the training of the machine learning model may take place as a dedicated training phase. In other example embodiments, the machine learning model may be retrained dynamically at runtime by the user providing live feedback.

The training data in this case may be information about contextual parameters related to the input variables and a label indicating whether corresponding data sets are to be processed synchronously or asynchronously. The machine learning model may be trained to predict a classification of "synchronously" or "asynchronously" for a given set of input variables at evaluation-time.

FIG. 1 is a block diagram illustrating a system 100, in accordance with an example embodiment. An external PDM system 102 may send messages, including payload to process, to a PLMSI application 104 running on an enterprise server 106. In an example embodiment, the enterprise server 106 is an SAP Web Application Server running mySAP Product Lifecycle Management ("PLM") business application software, which may correspond to the PLMSI application 104, both available from SAP SE of Walldorf, Germany. The SAP PLM business application can be used for life-cycle data management, program and product management, life-cycle collaboration, quality management, asset life-cycle management, and environment, health and safety management.

Data associated with a business application is stored in an application database 108 accessible by the enterprise server 106. Although only one application database 108 is shown in FIG. 1, the depicted single application database 108 represents any physical or virtual, centralized or distributed database suitable for the receipt and storage of files. Each file is an entity of data, i.e., a string of bytes that is capable of being manipulated as an entity. The files can represent any kind of information, such as text, images, executables, or simply binary data.

The PLMSI application 104 includes a user interface component 110, which is used for monitoring of processed data by a user. The PLMSI application 104 may further include a message and process orchestration layer 112, which will be described in more detail below. The message and process orchestration layer 112 acts to process payloads in messages sent from the external PDM system 102, and update domain model data 114 and/or object data 116 in the application database 108 as required, using a business object layer 118 and/or one or more application program interfaces (APIs) 120. The business object layer 118 may store various different structures for storing different data types, such as product versions, structure versions, document version, product operation lists, and variant definitions.

The message and process orchestration layer 112 may include an PLMSI endpoint 122, which acts to receive messages from the external PDM system 102 and send response messages to the external PDM system 102. These messages are sent and received through a synchronous protocol, such as HTTP.

A request processor 124 acts to perform the actual processing of the payloads in the request. A message persistency component 126 acts to store messages, such as by use of a data structure like a queue.

As will be seen below, in some example embodiments, additional components may be added to the message and process orchestration layer 112 for additional functionality.

More specifically, in some example embodiments, a monitor endpoint may be added to the message and process orchestration layer 112, in order to allow for an external PDM system 102 to poll and check the status of the processing. Specifically, the external PDM system 102 can initiate an HTTP GET request at an HTTP response header "location" obtained from a prior step. The process orchestration layer 112 is then able to query the message persistency component 126 to obtain the status of the processing, which it can then return via an HTTP response.

Figure 2:
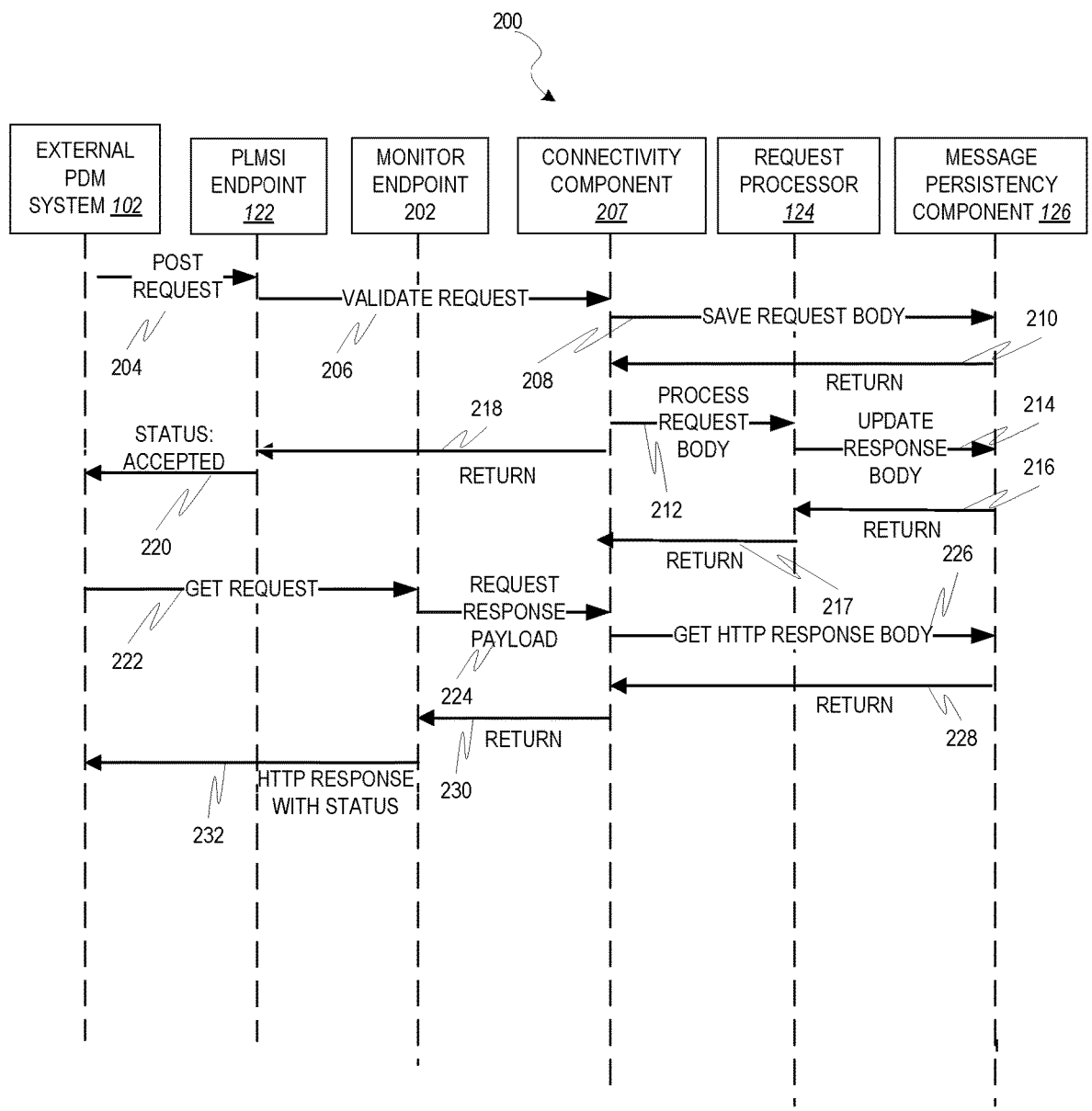
FIG. 2 is a sequence diagram illustrating a method for asynchronous processing of a Product Data Management (PDM) message in accordance with an example embodiment.

FIG. 2 is a sequence diagram illustrating a method 200 for asynchronous processing of a Product Data Management (PDM) message in accordance with an example embodiment. In this example embodiment, the aforementioned monitor endpoint 202 is added to allow for polling and checking the status of processing.

At operation 204, the external PDM system 102 sends a POST Request to the PLMSI endpoint 122. In this example, the POST Request contains an indication that asynchronous processing of the body of the corresponding message is preferred. At operation 206, the PLMSI endpoint 122 validates the technical correctness of the request. This may include, for example, verifying that the request complies with the relevant protocol(s) and passing it a connectivity component 207. The connectivity component 207 then saves the request body to the message persistency component 126 at operation 208. At operation 210, the message persistency component 126 sends a return message to the connectivity component 207.

At operation 212, the connectivity component 207 directs the request processor 124 to process the request body. Once it does, it updates the message persistency component 126 with the response body at operation 214. At operation 216, the message persistency component 126 sends a return message to the request processor 124. At operation 217, the request processor 124 sends a return message to the connectivity component 207.

At operation 218, the connectivity component 207 sends a return message to the PLMSI endpoint 122, which, at operation 220, returns a status: accepted message to the external PDM system 102. This status: accepted message may further include a location.

Notably, since the processing performed by the request processor 124 is performed asynchronously, operations 218 and 220 can be performed at any time after operation 212. Thus, operations 218 and 220 can be performed before operations 214 and 216. This reduces or eliminates the chances of a timeout being generated if the request takes a long time to process.

As mentioned earlier, a monitor endpoint 202 may be used to facilitate polling from the external PDM system 102 for status information. Here, the location passed in operation 220 is the location of the monitor endpoint 202. At operation 222, the external PDM system 102 may issue a GET Request to the location. At operation 224, the monitor endpoint 202 requests a response payload from the connectivity component 207. At operation 226, the connectivity component 207 issues a GET HTTP response body to the message persistency component 126, which at operation 228 issues a return message. At operation 230, the connectivity component 207 issues a return message to the monitor endpoint 202, and at operation 232 the monitor endpoint 202 updates the external PDM system 102 with the current status via an HTTP Response.

Figure 3:
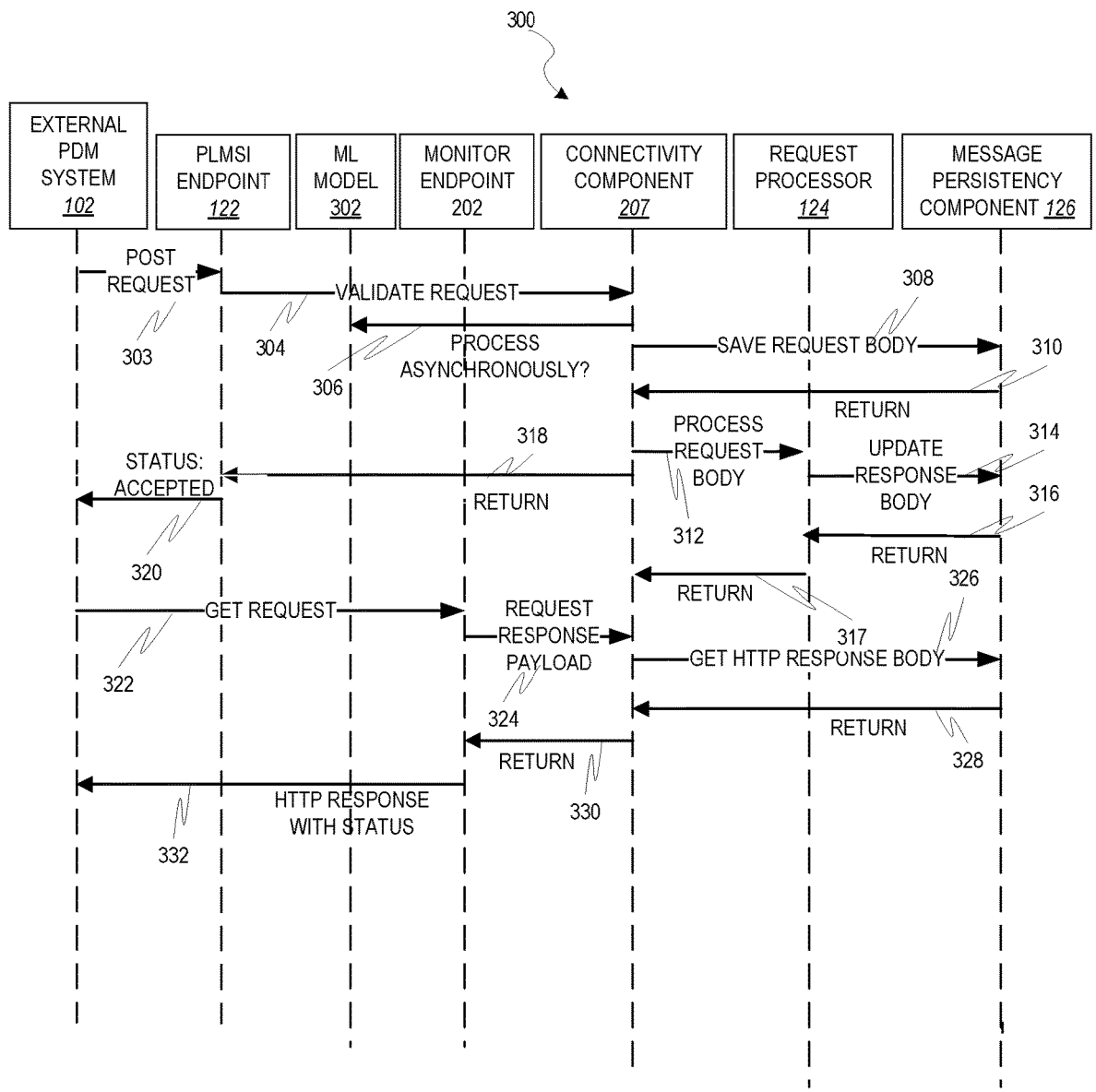
FIG. 3 is a sequence diagram illustrating a method for asynchronous processing of a Product Data Management (PDM) message in accordance with another example embodiment.

FIG. 3 is a sequence diagram illustrating a method 300 for asynchronous processing of a Product Data Management (PDM) message in accordance with another example embodiment. This example embodiment is similar to that of FIG. 2, except in this case a machine learning model 302 makes the determination to process the request asynchronously rather than synchronously.

At operation 303, the external PDM system 102 sends a POST Request to the PLMSI endpoint 122. At operation 304, the PLMSI endpoint 122 validates the technical correctness of the request. This may include, for example, verifying that the request complies with the relevant protocol(s) and passing it to a connectivity component 207. At operation 306, the connectivity component 207 then determines, using the machine learning model 302, that the request should be processed asynchronously. The connectivity component 207 then saves the request body to the message persistency component 126 at operation 308. At operation 310, the message persistency component 126 sends a return message to the connectivity component 207.

At operation 312, the connectivity component 207 directs the request processor 124 to process the request. Once it does, it updates the message persistency component 126 with the response body at operation 314. At operation 316, the message persistency component 126 sends a return message to the request processor 124. At operation 317, the request processor 124 sends a return message to the connectivity component 207

At operation 318, the connectivity component 207 sends a return message to the PLMSI endpoint 122, which, at operation 320, returns a status: accepted message to the external PDM system 102. This status: accepted message may further include a location.

Notably, since the processing performed by the request processor 124 is performed asynchronously, operations 318 and 320 can be performed at any time after operation 312. Thus, operations 318 and 320 can be performed before operations 314 and 316. This reduces or eliminates the chances of a timeout being generated if the request takes a long time to process.

As mentioned earlier, a monitor endpoint 202 may be used to facilitate polling from the external PDM system 102 for status information. Here, the location passed in operation 320 is the location of the monitor endpoint 202. At operation 322, the external PDM system 102 may issue a GET Request to the location. At operation 324, the monitor endpoint 202 requests a response payload from the connectivity component 207. At operation 326, the connectivity component 207 issues a GET HTTP response body to the message persistency component 126, which, at operation 328, issues a return message. At operation 330, the connectivity component 207 issues a return message to the monitor endpoint 202, and at operation 332 the monitor endpoint 202 updates the external PDM system 102 with the current status via an HTTP response.

Figure 4:
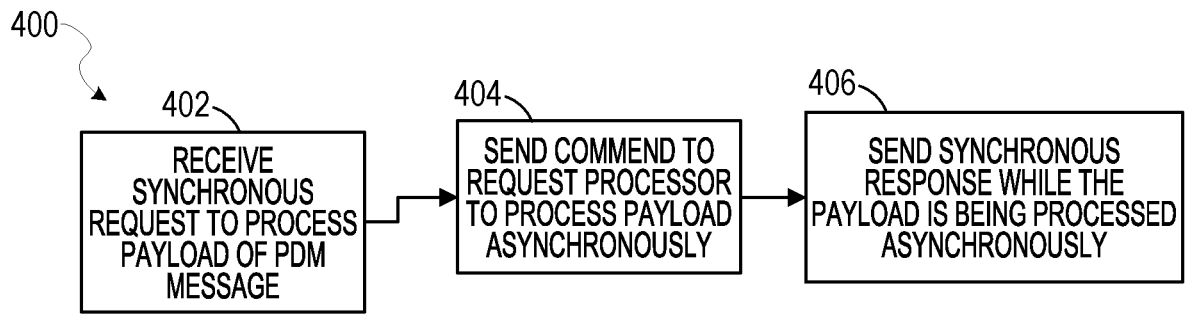
FIG. 4 is a flow diagram illustrating a method for processing the payload of a PDM message, in accordance with an example embodiment.

FIG. 4 is a flow diagram illustrating a method 400 for processing the payload of a PDM message, in accordance with an example embodiment. At operation 402, a synchronous request to process the payload of a PDM message is received from an external product data management (PDM) system. At operation 404, a command is sent to a request processor to process the payload of the message asynchronously. At operation 406, while the payload of the message is being processed asynchronously, a synchronous response is sent, to the external PDM system, to the synchronous request.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
receiving, from an external product data management (PDM) system, a synchronous request to process a payload of a message;
sending a command to a request processor to process the payload of the message asynchronously; and
while the payload of the message is being processed asynchronously, sending a synchronous response, to the external PDM system, to the synchronous request.

Example 2. The system of Example 1, wherein the operations further comprise: determining that the payload of the message should be processed asynchronously.

Example 3. The system of Example 2, wherein the determining is performed by examining a header attribute of the synchronous request.

Example 4. The system of Example 2, wherein the determining is performed by passing one or more variables relating to the payload and/or the request processor into a machine learning model trained to output a classification regarding whether to process a payload synchronously or asynchronously.

Example 5. The system of Example 4, wherein the one or more variables include payload size.

Example 6. The system of Example 5, wherein the one or more variables further include one or more of a deepness of an object data structure in the payload, a processing workload of the request processor, and an available memory capacity of the request processor.

Example 7. The system of any of Examples 1-6, wherein the operations further comprise: breaking up the payload into a plurality of smaller message packages and storing the smaller message packages in a queue for processing.

Example 8. A method comprising:
receiving, from an external product data management (PDM) system, a synchronous request to process a payload of a message;
sending a command to a request processor to process the payload of the message asynchronously; and
while the payload of the message is being processed asynchronously, sending a synchronous response, to the external PDM system, to the synchronous request.

Example 9. The method of Example 8, further comprising: determining that the payload of the message should be processed asynchronously.

Example 10. The method of Example 9, wherein the determining is performed by examining a header attribute of the synchronous request.

Example 11. The method of Example 9, wherein the determining is performed by passing one or more variables relating to the payload and/or the request processor into a machine learning model trained to output a classification regarding whether to process a payload synchronously or asynchronously.

Example 12. The method of Example 11, wherein the one or more variables include payload size.

Example 13. The method of Example 12, wherein the one or more variables further include one or more of a deepness of an object data structure in the payload, a processing workload of the request processor, and an available memory capacity of the request processor.

Example 14. The method of any of Examples 8-13, further comprising: breaking up the payload into a plurality of smaller message packages and storing the smaller message packages in a queue for processing.

Example 15. A non-transitory machine-readable medium storing instructions which, when executed by one or more processors, cause the one or more processors to perform operations comprising:
receiving, from an external product data management (PDM) system, a synchronous request to process a payload of a message;
sending a command to a request processor to process the payload of the message asynchronously; and
while the payload of the message is being processed asynchronously, sending a synchronous response, to the external PDM system, to the synchronous request.

Example 16. The non-transitory machine-readable medium of Example 15, wherein the operations further comprise: determining that the payload of the message should be processed asynchronously.

Example 17. The non-transitory machine-readable medium of Example 16, wherein the determining is performed by examining a header attribute of the synchronous request.

Example 18. The non-transitory machine-readable medium of Example 16, wherein the determining is performed by passing one or more variables relating to the payload and/or the request processor into a machine learning model trained to output a classification regarding whether to process a payload synchronously or asynchronously.

Example 19. The non-transitory machine-readable medium of Example 18, wherein the one or more variables include payload size.

Example 20. The non-transitory machine-readable medium of Example 19, wherein the one or more variables further include one or more of a deepness of an object data structure in the payload, a processing workload of the request processor, and an available memory capacity of the request processor.

Figure 5:
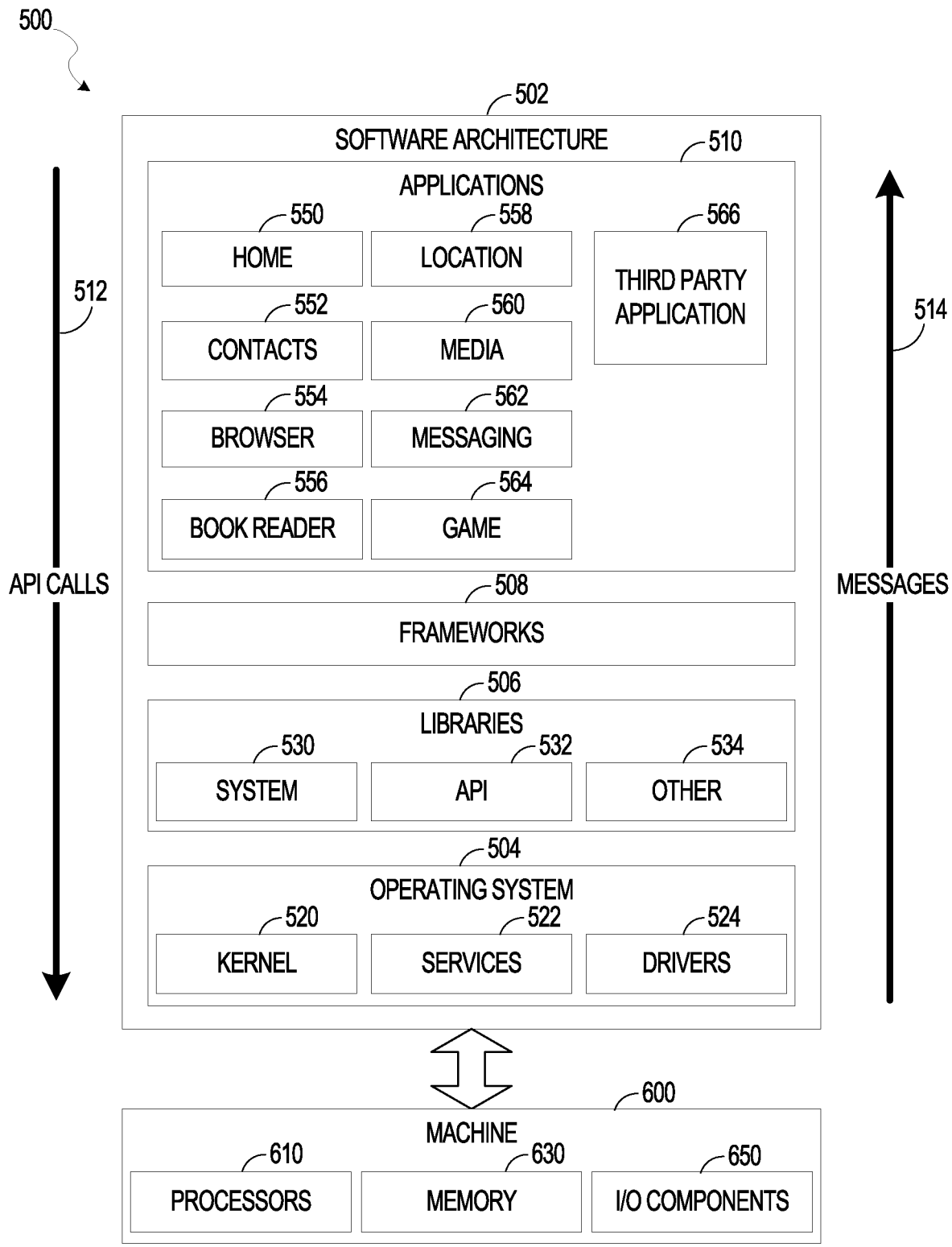
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions and three dimensions in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
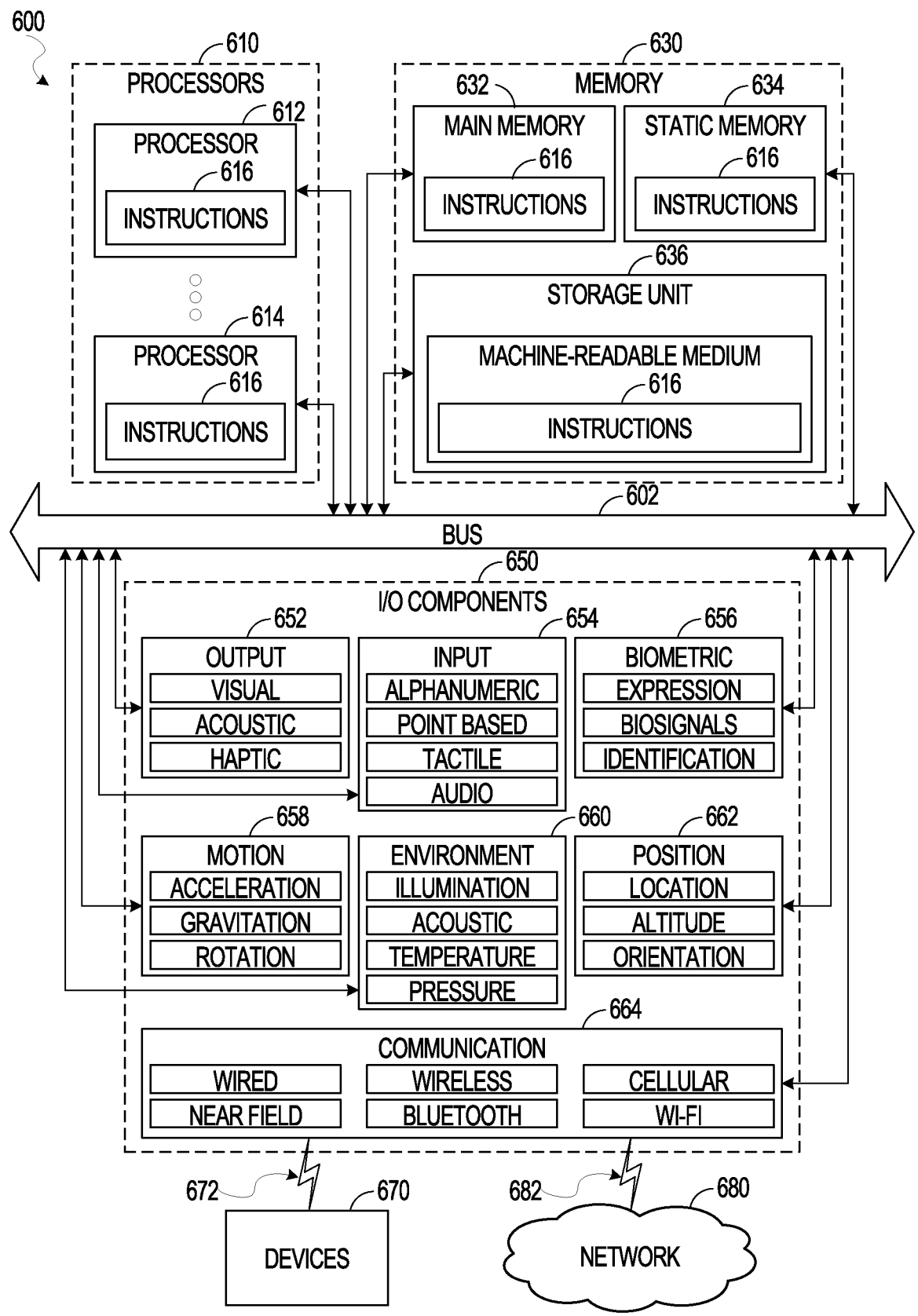
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
receiving, from an external product data management (PDM) system, a synchronous request to process a payload of a message;
breaking up the payload into a plurality of smaller message packages and storing the smaller message packages in a queue for processing;
sending a command to a request processor to process the payload of the message asynchronously by processing the smaller message packages in parallel once each smaller message package has been determined to be successfully validated; and
while the payload of the message is being processed asynchronously, sending a synchronous response, to the external PDM system, to the synchronous request.

2. The system of claim 1, wherein the operations further comprise:
determining that the payload of the message should be processed asynchronously.

3. The system of claim 2, wherein the determining is performed by examining a header attribute of the synchronous request.

4. The system of claim 2, wherein the determining is performed by passing one or more variables relating to the payload and/or the request processor into a machine learning model trained to output a classification regarding whether to process a payload synchronously or asynchronously.

5. The system of claim 4, wherein the one or more variables include payload size.

6. The system of claim 5, wherein the one or more variables further include one or more of a deepness of an object data structure in the payload, a processing workload of the request processor, and an available memory capacity of the request processor.

7. The system of claim 1, wherein the plurality of smaller message packages are processed out-of-order.

8. A method comprising:
receiving, from an external product data management (PDM) system, a synchronous request to process a payload of a message;
breaking up the payload into a plurality of smaller message packages and storing the smaller message packages in a queue for processing;
sending a command to a request processor to process the payload of the message asynchronously by processing the smaller message packages in parallel once each smaller message package has been determined to be successfully validated; and
while the payload of the message is being processed asynchronously, sending a synchronous response, to the external PDM system, to the synchronous request.

9. The method of claim 8, further comprising:
determining that the payload of the message should be processed asynchronously.

10. The method of claim 9, wherein the determining is performed by examining a header attribute of the synchronous request.

11. The method of claim 9, wherein the determining is performed by passing one or more variables relating to the payload and/or the request processor into a machine learning model trained to output a classification regarding whether to process a payload synchronously or asynchronously.

12. The method of claim 11, wherein the one or more variables include payload size.

13. The method of claim 12, wherein the one or more variables further include one or more of a deepness of an object data structure in the payload, a processing workload of the request processor, and an available memory capacity of the request processor.

14. The method of claim 8,
wherein the plurality of smaller message packages are processed out-of-order.

15. A non-transitory machine-readable medium storing instructions which, when executed by one or more processors, cause the one or more processors to perform operations comprising:
receiving, from an external product data management (PDM) system, a synchronous request to process a payload of a message;
breaking up the payload into a plurality of smaller message packages and storing the smaller message packages in a queue for processing;
sending a command to a request processor to process the payload of the message asynchronously by processing the smaller message packages in parallel once each smaller message package has been determined to be successfully validated; and
while the payload of the message is being processed asynchronously, sending a synchronous response, to the external PDM system, to the synchronous request.

16. The non-transitory machine-readable medium of claim 15, wherein the operations further comprise:
determining that the payload of the message should be processed asynchronously.

17. The non-transitory machine-readable medium of claim 16, wherein the determining is performed by examining a header attribute of the synchronous request.

18. The non-transitory machine-readable medium of claim 16, wherein the determining is performed by passing one or more variables relating to the payload and/or the request processor into a machine learning model trained to output a classification regarding whether to process a payload synchronously or asynchronously.

19. The non-transitory machine-readable medium of claim 18, wherein the one or more variables include payload size.

20. The non-transitory machine-readable medium of claim 19, wherein the one or more variables further include one or more of a deepness of an object data structure in the payload, a processing workload of the request processor, and an available memory capacity of the request processor.

* * * * *